United States Patent Office 2,693,946
Patented Nov. 9, 1954

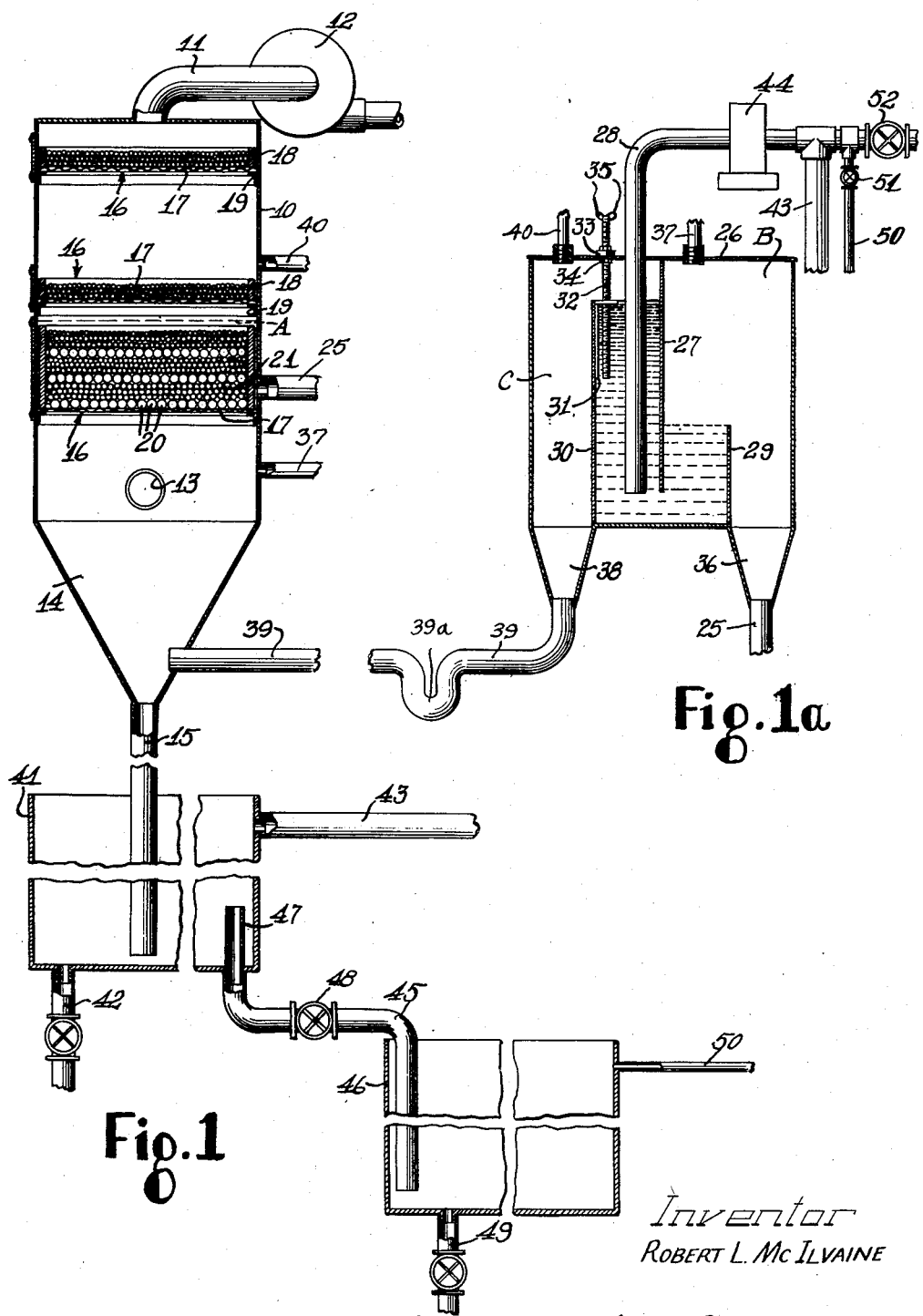

2,693,946

METHOD OF AND APPARATUS FOR SEPARATING DUST FROM WATER OR OTHER LIQUIDS

Robert L. McIlvaine, Chicago, Ill., assignor, by mesne assignments, to Herbert Simpson Corporation, Chicago, Ill., a corporation of Illinois Application February 5, 1951, Serial No. 209,394

9 Claims. (Cl. 261—3)

The present invention relates to a method of an apparatus for removing a solid contaminant from a liquid washing medium, and more particularly to a method and apparatus for separating dust or other particles from water or similar washing media.

One type of dust-collecting or air-washing equipment in general use utilizes water or a similar liquid through which an air stream is passed, the liquid scrubbing the dirt or other contaminant from the air stream. In order to separate the solid contaminant from the liquid scrubbing medium, conventional practice has utilized settling tanks for effecting gravity separation of the materials. If course, it is quite desirable to recirculate the liquid from which the contaminant has been separated to lower the cost of the liquid medium and to avoid the overtaxing of sewage facilities.

Within a given time period, relatively fine dust particles may not have sufficient time to become separated from the liquid medium, and in scrubbing equipment for removing air-floated clays or other colloidal matter separation is particularly difficult after the solid content of the liquid medium has reached a definite saturation point, inasmuch as jelly-like scum is formed within the liquid which clogs the operating portions of the system, such as the pumps and the like. In order to lower the dust content below this saturation value, it has heretofore been necessary to add fresh water or other liquid prior to recycling of the liquid medium, thus raising the cost of the operation and necessitating sewage disposal of a portion of the saturated liquid medium.

The present invention now contemplates the utilization of a plurality of successive settling tanks of substantially constant capacity and each preferably receiving successively smaller portions of the liquid medium. In this manner, the liquid medium remains for a longer period of time within successive tanks so that separation of dust or even semi-colloidal particles is enhanced. Thus, it is possible to substantially eliminate the dust content of the final liquid medium which then may be added to the medium from the first settling tank so as to greatly reduce the solids concentration of the recycled liquids medium while avoiding the necessity of adding fresh liquid.

It is, therefore, an important object of the present invention to provide an improved method for the separation of a solid contaminant from a liquid washing medium by the subjection of the contaminated medium to successive settling steps whereby the contaminant concentration may be greatly reduced and then mixing the settled and substantially non-contaminated medium with additional medium of higher contaminant concentration to reduce the overall contaminant concentration to a value well below the saturation point.

Another important object of the present invention is to provide apparatus for separating solid contaminant from a liquid medium by means of successive settling tanks wherein the liquid medium remains for increasing periods of time, together with means for reintroducing the settled medium into a medium of higher solids concentration to reduce the overall solids content.

Still another important object of the present invention is to provide a method for the separation of a solid contaminant from a liquid washing medium which comprises the steps of flowing the medium through successive settling tanks for increasing the periods of time, with the increased time period accommodating relatively greater separation of solids from the liquid medium, and then uniting the medium from which the solids have been settled with additional medium of high solids concentration to reduce the overall medium solids concentration to a value less than the saturation value thereof.

An important feature of the present invention is its adaptability for utilization with air-washing devices of the type wherein a contaminated fluid stream is passed through a liquid bath having successive bubble-forming and bubble-bursting chambers, preferably as set forth in my applications for patent Serial No. 180,802 and Serial No. 180,803, filed August 22, 1950, now respectively Patents 2,645,304, dated July 14, 1953, and 2,662,756, dated December 15, 1953, and assigned to the assignee of the present invention. An additional important feature of the present invention is the adaptability of the settling system to utilization with a constant level water supply control also as disclosed and claimed in my above patents.

It is, therefore, an additional important object of the present invention to provide apparatus for separating solid contaminant from a liquid scrubbing medium for recycling of the liquid medium through a constant level liquid supply control to an air cleaner construction having successive bubble-forming and bubble-bursting liquid bath zones.

Other and further important objects of this invention will be apparent from the disclosures in the specification and the accompanying drawings.

On the drawings:

Figures 1 and 1a of the drawing are cross-sectional somewhat schematic reupresentations of a complete air cleaner including an air cleaning unit, a water supply control unit, and a settling tank arrangement of the present invention.

As shown on the drawings:

In the drawings, the reference numeral 10 refers generally to a substantially rectangular casing provided with an upper outlet conduit 11 having a fluid impeller, such as a centrifugal pump 12, for drawing dust-laden air or similar fluid into the casing through an inlet port 13, the casing 10 being provided with a lower sump portion 14 discharging through a conduit 15 into a settling tank 41, to be hereinafter more fully described.

The casing 10 intermediate the fluid inlet 13 and the discharge conduit 11 is provided with a plurality of superimposed trays 16, each having a perforate bottom defined by a wire screen or the like 17 and upstanding side walls 18 seated upon angle iron supports 19 spaced along the vertical length of the casing. The lower tray 16 is substantially filled with a plurality of particulated strata each made up of a plurality of layers of varying sizes of substantially spheroidal particles.

More particularly, the screen 17 of the lowermost tray carries directly thereon a layer of relatively large spheroids 20, and a plurality of layers of relatively smaller spheroids 21 are seated upon and overlie the larger spheroids 20. The second stratum is built up in the same manner as the first stratum of relatively large particles superimposed on the smaller particles 21 of the lower stratum. As shown on the drawings, three strata, each composed of one layer of relatively large particles 20 and three layers of relatively small particles 21, are disposed within the lowermost tray 16. However, it will be appreciated that the number of strata and the number of layers in each stratum may be varied as desired.

The second tray 16 is supported within the casing 10 and in closely spaced relation to and directly overlying the first tray 16. The second tray 16 is substantially filled with a number of layers of uniformly sized particles 21. The third tray 16 is of substantially the same size as the second tray and is interposed between the second tray and the outlet conduit 11 to closely underlie the latter. It will be seen that dust-laden fluid entering the inlet port 13 will be drawn through each of the trays 16 in turn as it flows through the casing toward the outlet conduit 11 under the influence of the impeller 12.

The casing 10 is also adapted to contain a body of water to be maintained at a substantially constant level A as indicated in dot-dash lines in Figure 1. As the level A is built up, the water bath will enclose the first tray 16 with water being drawn from the tray also passing through the water bath. Water or other suitable liquid is introduced into the casing through a water inlet pipe 25 which communicates with the interior of the lowermost tray 16 through registering apertures in the adjacent casing side wall and the tray side wall.

Water is supplied to the conduit 25 through a water level control box 26 disposed adjacent but above the casing 10 and subdivided into a pair of interior compartments B and C, respectively, by means of a central baffle depending from the box tops into closely spaced relation to the bottom of the box. The chambers B and C are in communication with one another beneath the baffle 27, and water is introduced into the chambers through an inlet pipe 28 discharging into the chamber C adjacent the lowermost edge of the baffle 27.

The chamber B has mounted therein a relatively low dam 29 extending transversely across the chamber interior in spaced parallel relation to the baffle 27, and the chamber C has mounted therein a somewhat higher dam 30 also extending thereacross parallel to and in spaced relation to baffle 27. The baffle 30 is provided with an adjustable plate 31 carried by an adjusting screw 32 projecting through the top of the box 26 through a suitable fitting 33 provided with an opposed lock nut 34. It will be seen that the vertical positioning of the extension 31 relative to the dam may be accomplished by turning the screw, through the medium of a pair of ears 35, upon loosening of the lock nut 34.

The chamber B is provided with a lower tapered outlet portion 36 establishing communication between the chamber B and the water inlet line 25. The upper portion of the chamber B is also vented to the interior of the casing 10 beneath the lowermost tray 16 and the water bath thereabout through a line 37. The chamber C is provided with a lowered tapered outlet portion 38 establishing communication between the chamber, and a conduit 39 establishes fluid flow between the chamber C and the sump portion 14 of the casing 10. The upper portion of the chamber C is connected to the casing interior through line 40 in a zone between the uppermost and the intermediate trays 16. A trap 39a is provided in the conduit 39 to prevent back flow of air from the sump portion 14 through the pipe 39 into the box 26 and thence through pipe 40 into the casing 10.

In the operation of the device of Figures 1 and 1a, it will be appreciated that the flow box 26 functions to maintain the water bath surrounding the lowermost tray 16 at a constant level, thereby maintaining a constant head pressure in this zone. This maintenance of a constant water level is possible by virtue of the venting of the chambers B and C to the differential pressure between fluid entering the casing prior to passage through the water bath and fluid leaving the water bath. This differential pressure is the result of the resistance of the water bath in the lower tray 16 and the intermediate tray to the passage of fluid therethrough. Due to the pressure loss through these trays, the absolute pressure in the chamber B will be greater than the pressure in chamber C. Expressed in another way, due to the presence of the impeller 12 in the outlet conduit 11, the vacuum pressure in the chamber C will be greater than the vacuum pressure within the chamber B.

The lower pressure within the chamber C will accommodate a higher water level behind the dam 30 than the water level accommodated behind the dam 29 by the pressure within the chamber B. The difference in water level within these chambers is equivalent to the differential pressure when expressed in inches or other linear height of water or other fluid column. Accordingly, it will be seen that upon initially starting the apparatus, the introduction of liquid to the box 26 will serve to fill the space defined by the dams 29 and 30 until such time that water will flow over the dam 29 to the inlet pipe 25 to surround the lowermost tray 16. After the water bath has been formed, and as the depth of the water bath increases, water will rise behind the dam 30 until such time as the water bath has reached its normal level and the dams accommodate their full measure of water as indicated in Figure 1.

At this time the full permissive pressure differential between the chambers will be obtained, and any increase in the depth of the water bath will increase this differential pressure, causing the flow of water over the dam 30 through the conduit 39 into the sump portion 14 of the casing. Thus, water flow through the pipe 28 will occur directly to the sump rather than to the water bath itself.

As soon as the water bath level drops, due to gravity drainage of water through the tray 16, the differential pressure will decrease and the lesser pressure within the chamber B will accommodate flow of water over the dam 29 and through the conduit 25 into the water bath proper. Thus, if the water level A is as high as desired, further water flow through the inlet conduit 28 will cause flow over the dam 30 into the sump 14, and while the water level of the bath is below the level A, continuous flow through the inlet pipe 28 will be directed over the dam 29 and through the inlet conduit 25 into the water bath to raise the level thereof.

With regard to the functioning of the permeable barriers directed within the casing 10, the lowermost tray 16 contains a plurality of strata made up of layers of spheroidal particles of varying size providing varying sizes of interstices between the spheroids. The smaller interstices between the smaller spheroids will cause the formation of bubbles within the liquid bath, and these bubbles burst upon entering the relatively larger interstices between the larger spheroids 20. This action occurs throughout the depth of the lowermost tray 16, while those bubbles emerging from the uppermost rows of relatively small spheroids will burst thereabove at or near the water level A.

This formation and bursting of spheroids plays an important part in the effective removal of dust from fluid introduced through the inlet 13, inasmuch as the formation of bubbles causes the adhesion of dust dispersed in the fluid to the wall of the bubbles, and the bursting of the bubbles causes entrapment of the dust by flying liquid particles thrown from the bubbles by the bursting force. Those bubbles which burst at or near the water line A will cause the wetting of the spheroid layer supported on tray 16 next thereabove, so that a plurality of wetted spheroidal surfaces are available for impingement of the remaining dust particles carried by the stream passing therethrough. This impingement upon a wetted surface removes still more dust from the air. The final tray 16 also aids in removing dust from the air inasmuch as it also prevents the passage of liquid particles entrapped in the air into the upper conduit 11.

As indicated in the drawing, the conduit 15 discharges into the settling tank 41 which is provided with a drainage valve 42 positioned in the bottom thereof for removing solids and/or sludge from the settling tank proper. The conduit 15 extends into proximity to the bottom wall of the settling tank 41 and an upper discharge conduit 43 is provided for removing water from the upper portions of the tank. The conduit 43 communicates with the water inlet conduit 28 hereinbefore described and a suitable pump 44 is provided for pumping water from the settling tank 41 into the flow box 26 for later introduction into the casing 10 as hereinbefore described.

It will be appreciated that liquid discharged through the line 15 will be permitted to remain within the settling tank 41 until the heavier solids material therein has had an opportunity to settle to the bottom of the tank, so that the material drawn off from the tank 41 through the line 43 will have only relatively fine material, such as colloidal particles and the like, dispersed therein.

A definite portion of the washing medium within the tank 41 is withdrawn through a depending line 45 for introduction into a second and lower settling tank 46. The tank 46 is preferably of substantially the same size as the tank 41, and the conduit 45 extends upwardly an appreciable distance, as at 47, into the tank 41 so that the washing medium withdrawn through the line 45 into the lower tank 46 is substantially free of heavier solids which settle out within the tank 41. A valve 48 is provided in the line 45 to control the flow of water or other washing medium from the tank 41 into the tank 46, and preferably the flow through the line 45 is correlated to the contamination saturation value of the washing medium as it is received from the casing 10 by the tank 41. The tank 46 is likewise provided with a lower solids discharge line 49 and with an upper recycling line 50 which communicates through a valve 51 with the inlet line 28. The inlet line 28, ahead of the conduits 43 and 50, is provided with a manual flow control valve 52 for controlling the inlet of fresh water into the system through the line 28.

The operation of the settling tank system involves the settling out of relatively large solid particles within the first settling tank 41 and the recycling of the majority of the effluent through the line 43 into the inlet line 28. A proportion of the effluent within the settling tank 41 is introduced into the lower settling tank 46 through the line 45 for further settling, and this further settled liquid medium is introduced into inlet line 28 for commingling with the first effluent through the line 43.

Assuming that 10% of new water is required to keep the contaminant saturation below the critical point at which settling out and colloidal agglomeration occurs, and that the tank 46 is of a capacity equal to the capacity of the tank 41, then 10% of the effluent within the tank 41 is introduced into the second tank 46 through the line 45. This 10% of later settled water can be readily controlled by manipulation of the manual valve 48. Since the tanks have an equal capacity and one-tenth as much water is introduced into the tank 46, then water within the tank 46 will have ten times as long a settling time, which is ample to settle out sufficient material to lower the degree of contaminant saturation well below the critical point. The water from the tank 46, by virtue of its longer settling time, will be substantially free of even finely divided contaminant and this water is substantially the equivalent of fresh water which may be added to the water from the first settling tank 41 to maintain the contaminant content of the first water below the saturation level. Thus, it is possible by utilization of the second settling tank 46 to materially reduce the amount of fresh or new water which must be added to the contaminated dirty water to prevent agglomeration, etc. If it is necessary to add new water, this may be readily accomplished through manipulation of the manual valve 52, and the percentage of twice-settled water may be readily adjusted by manipulation of the valve 51.

Thus, it will be seen that the present invention provides a method and means for reducing the contaminant saturation of a contaminated washing medium to a value well below the saturation value thereof while necessitating the addition of little or no additional fresh washing medium. The utilization of a pair of settling tanks with the flow rate to the second of the tanks being correlated with the contaminant saturation critical value makes possible the efficient operation of the device without the addition of new washing medium. Further, the device is adapted to be utilized in conjunction with an efficient solids-removal unit and the recycled washing medium is introduced through a level-control apparatus to insure efficient operation of the washing apparatus.

It will be understood that modifications and variations may be effected without departing from the scope of the novel concepts of the present invention.

I claim as my invention:

1. The method of removing contaminant solids from a contaminated fluid medium which includes the steps of introducing the contaminated medium into a first settling zone, retaining said contaminated medium in said first zone for a period of time sufficient to remove coarse solids therefrom, recycling a major portion of the effluent from said first zone for reuse, introducing a portion only of said effluent from said first zone into a second settling zone, retaining said effluent portion in said second zone for a substantially greater length of time to remove relatively fine solids therefrom, and uniting effluent from said second settling zone with the major portion of the effluent from said first zone to reduce the contaminant content of said major portion of said effluent.

2. A method of removing contaminant solids from a contaminated fluid medium to reduce the contaminant content of said medium to a value below the critical point, which includes the steps of introducing the contaminated medium into a first settling zone, retaining the contaminated medium in said first zone for a period of time sufficient to remove coarse solids therefrom, withdrawing substantially coarse solids-free effluent from said first zone, introducing a portion only of the effluent from said first zone into a second settling zone for an extended period of time to remove relatively smaller solids therefrom, uniting the effluent from said second zone with the effluent of said first zone in an amount sufficient to reduce the contaminant solids content of the combined effluent to a value less than the critical contaminant solids content, and recycling the combined effluents for reuse.

3. In a method of reusing a contaminated fluid medium from a solids-removal apparatus, the steps which comprise introducing solids-contaminated liquid medium into a first settling zone, retaining said contaminated medium in said zone for a period of time sufficient to remove coarse solids particles therefrom, withdrawing a major portion of the effluent from said first zone, introducing a portion only of said effluent from said first zone into a settling zone of substantially the same capacity as said first zone, retaining said effluent in said second zone for a period of time sufficient to remove relatively smaller solids therefrom, merging effluent from both of said zones, and supplying said merged effluent under pressure to an inlet conduit for recycling through said apparatus.

4. In a method of collecting dust from a fluid stream by passing the fluid stream through a liquid bath, the steps of withdrawing contaminated liquid from said bath, introducing said contaminated liquid into a first settling zone, retaining said contaminated medium in said first settling zone to remove coarse solids therefrom, withdrawing a portion only of the effluent from said first zone, introducing said withdrawn effluent into a second settling zone, retaining the withdrawn effluent in said second zone to remove relatively smaller solids therefrom, withdrawing substantially solids-free effluent from said second zone, merging the effluents from both of said zones, and reintroducing the merged effluents into said liquid bath.

5. In a dust collector having a casing provided with an inlet for dust-laden air, an outlet for clean air and an air passageway therebetween, the improvements which comprise means for flowing liquid through said passageway in a direction counter-current to the passage of air therethrough, a settling tank receiving liquid from said bath to remove relatively coarse solids particles therefrom, a conduit communicating with said settling tank above the bottom thereof, a second settling tank connecting with said conduit for receiving a portion of the effluent from said first settling tank to accommodate the removal of relatively finer solids particles therefrom, each tank having a drain at the level of the bottom thereof independent of the other drain and independent of said conduit, and means for merging the effluent from each of said settling tanks for reintroduction into said liquid bath.

6. In combination with a dust collector having a liquid bath adapted for the flow of dust-laden air therethrough, a first settling tank for receiving contaminated liquid from the liquid bath to accommodate the settling of relatively coarse contaminant particles therefrom, a second settling tank receiving a portion only of the coarse solids-free liquid from said first settling tank to accommodate the removal of relatively smaller solids particles therefrom, said tanks having independent drains for removal of solids therefrom, means for merging relatively solids-free liquids from said settling tanks, and means for reintroducing said liquid into the liquid bath of said dust collector.

7. In a dust collector having means for introducing a flow of fluid therethrough and a water bath interposed in the path of fluid flow, the improvements of a pair of settling tanks having substantially the same capacity, means for introducing contaminated water from said water bath to the first of said settling tanks, means for introducing a portion only of the effluent from said first settling tank into the second of said settling tanks, means for controlling the flow of water between said settling tanks, and means for merging the effluent from said settling tanks to obtain water having a contaminant concentration intermediate the concentrations of the effluent, respectively.

8. The method of removing contaminant solids from a contaminated fluid medium which includes the steps of introducing the contaminated medium into the lower portion of a first settling region at a first inlet rate, withdrawing a small portion of said medium from the lower portion of said first settling region at a substantially reduced rate and delivering said withdrawn small portion of said medium to the lower portion of a second settling region, withdrawing a major portion of said medium from said first region as it reaches a predetermined high level therein at a rate corresponding to the difference between said first inlet rate and said reduced rate, and withdrawing said medium from said second settling region as it reaches a predetermined high level therein at a rate corresponding generally to said reduced rate to permit longer settling of the contaminant solids from the medium in said second region, and uniting effluent from said second region with the major portion of said medium from said first region to reduce the contaminant content of said major portion of said medium.

9. In combination with a dust collector having a liquid bath adapted for the flow of dust-laden air therethrough, a first settling tank for receiving contaminated liquid from said bath to accommodate the settling of relatively coarse contaminated particles therefrom, conduit means at a high level in said first settling tank for withdrawing liquid therefrom as it reaches said level, a second settling tank, a conduit communicating with said first tank at a low level therein for delivering a portion only of the coarse solids-free liquid to said second settling tank, means for restricting flow in said conduit to a rate substantially less than the rate of receipt of liquid from said bath by said first settling tank to accommodate the removal of relatively smaller solid particles from the liquid in said second tank, means connecting to said second tank at a relatively high level therein for removal of liquid from said second tank as it reaches said relatively high level, means for merging said liquid from said settling tanks, and means for re-introducing said liquid into the liquid bath of said dust collector.

References Cited in the file of this patent

UNITED STATES PATENTS

| Number | Name | Date |
| --- | --- | --- |
| 1,312,477 | Gray | Aug. 5, 1919 |
| 1,602,705 | Riley et al. | Oct. 12, 1926 |
| 1,793,620 | Jacobus | Feb. 24, 1931 |
| 1,976,392 | Grilli | Oct. 9, 1934 |
| 1,986,913 | Anthony, Jr. | Jan. 8, 1935 |
| 2,090,143 | Nonhevel et al. | Aug. 17, 1937 |
| 2,163,452 | Schmieg | June 20, 1939 |
| 2,513,174 | Hess | June 27, 1950 |

FOREIGN PATENTS

| Number | Country | Date |
| --- | --- | --- |
| 390,144 | Great Britain | June 26, 1931 |